United States Patent

[11] 3,626,199

[72] Inventors Paul Aime' V Fleury Middletown; James Floyd Scott, Holmdel, both of N.J.

[21] Appl. No. 41,922

[22] Filed June 1, 1970

[45] Patented Dec. 7, 1971

[73] Assignee Bell Telephone Laboratories, Incorporated Murray Hill, N.J.

[54] TUNABLE VISIBLE OR ULTRAVIOLET FREQUENCY SHIFTER

7 Claims, 1 Drawing Fig.

[52] U.S. Cl. .......... 307/88.3, 321/69 R, 331/107 R

[51] Int. Cl. .......... H03f 7/04

[50] Field of Search .......... 307/88.3; 321/69

*Primary Examiner*—Roy Lake

*Assistant Examiner*—Darwin R. Hostetter

*Attorneys*—R. J. Guenther and Arthur J. Torsigliere

ABSTRACT: The disclosed broadly tunable visible or ultraviolet frequency shifter employs magnetic field tuning of Raman scattering from spin-reversal transitions of electrons or holes in semiconductors having parabolic conduction bands. Such frequency shifting is achieved in semiconductors having bandgaps in the visible and ultraviolet portions of the spectrum. The semiconductors employed are II–VI semiconductors, II–IV–V semiconductors, silicon carbide and organic semiconductors. The pumping light preferably has a frequency just below the bandgap frequency of the semiconductor.

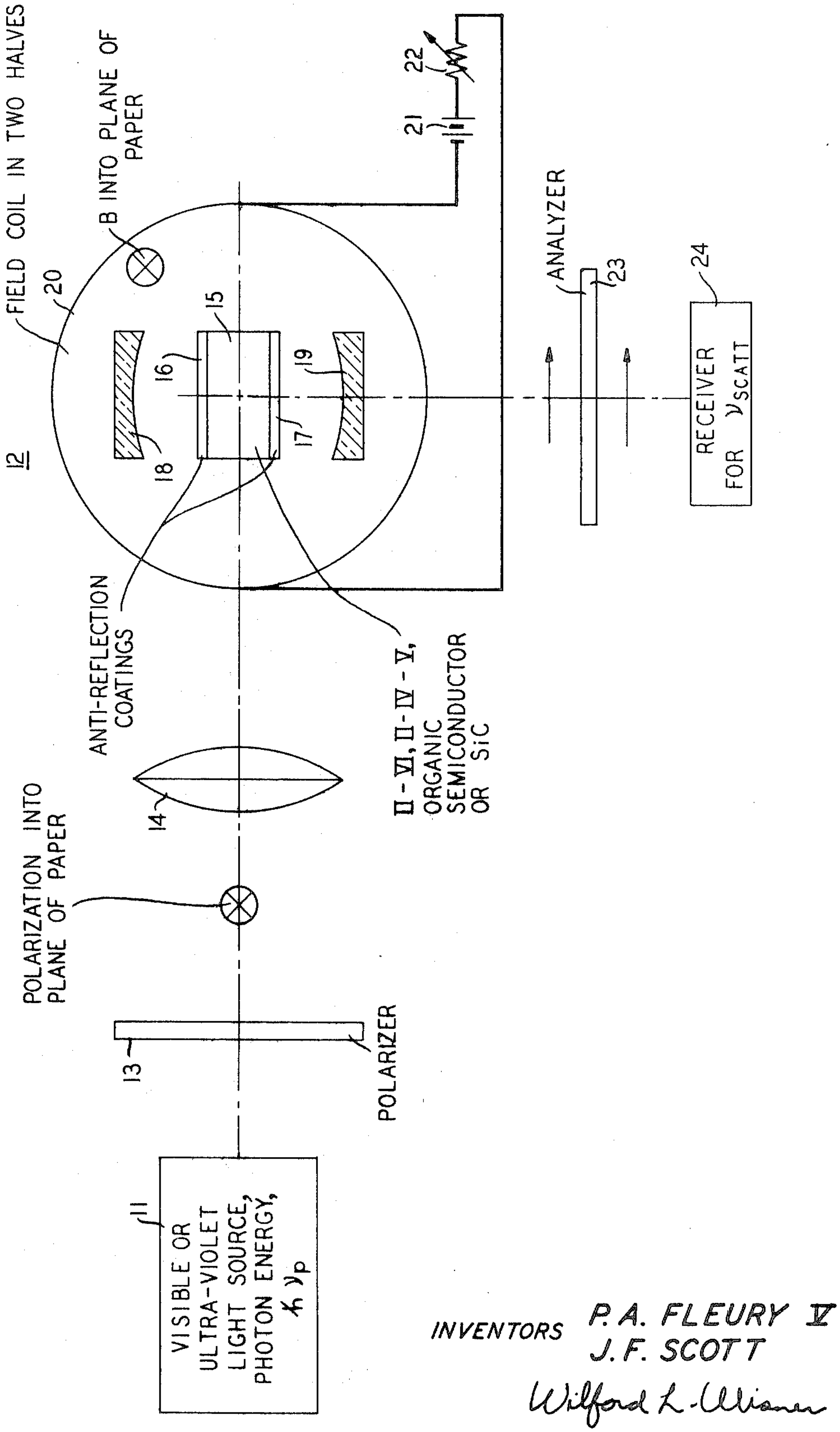
INVENTORS P. A. FLEURY V
J. F. SCOTT
Wilford L. Wisner
ATTORNEY

TUNABLE VISIBLE OR ULTRAVIOLET FREQUENCY SHIFTER

BACKGROUND OF THE INVENTION

This invention relates to optical frequency shifters, particularly those having substantial tuning over frequency bands in the visible or ultraviolet regions of the spectrum.

An example of a desirable sort of frequency shifter operating in the infrared region of the spectrum is that disclosed in Pat. No. 3,470,453 to P. A Fleury et al., issued Sept. 30, 1969. That frequency shifter employed scattering of coherent pumping light from charge carriers in a body of semiconductive material subjected to a magnetic field, so that the charge carriers underwent spin-reversal transitions or transitions involving change in cyclotron energy level in the presence both of a magnetic field and the coherent pumping radiation, Tuning is then obtained variation of the magnetic field due to the increase in quantum energy of these transitions with increasing field.

Perhaps because of the employment of transitions involving a change in cyclotron energy level, it was believed at the time of that invention that its principles were restricted to semiconductors in which the conduction band was substantially nonparabolic. Examples of such materials are indium antimonide and indium arsenide.

Since such materials have small semiconducting bandgaps corresponding to frequencies in the infrared portion of the spectrum, the possibility of employing similar principles in the visible and ultraviolet regions of the spectrum seemed remote.

Thus, an object of our invention is to extend the usable frequency range of frequency shifters employing such Raman scattering into the visible and ultraviolet regions of the spectrum.

A Raman-scattering process is a process in which incident radiation and a particle of matter, in this case mobile charge carriers in a semiconductor body, interact inelastically. The interaction is inelastic in that the scattered light has a frequency lower (or higher) than the frequency of the incident light by an amount equal to some characteristic frequency associated with the particle in its environment. Spin, as used hereinafter, refers to the spin of the mobile charge carrier itself and is a quantum-mechanical property of the carrier.

SUMMARY OF THE INVENTION

We have discovered that magnetic field tunable Raman scattering can be achieved from mobile charge carriers undergoing spin-reversal transitions in semiconductors which have parabolic conduction bands, contrary to the expectations derived from the above-cited patent. Our discovery resulted, in part, from our recognition that, while transitions involving changes in cyclotron energy level in such semiconductors were unlikely, we should attempt to scatter and to receive selectively light having a frequency differing from the pump light frequency by the frequency that is characteristic of the spin-reversal frequencies of mobile charge carriers.

In a preferred embodiment of our invention, readily observable frequency shifts of the above-described type are obtained by employing semiconductors with bandgap energies corresponding to relatively high visible frequencies or ultraviolet frequencies and by pumping them with coherent laser light of frequency just below the frequency corresponding to the bandgap energy. The effect, however, is not restricted to the use of coherent or laser light.

According to a feature of our invention, suitable semiconductors include the II–VI semiconductors, of which cadmium sulfide and zinc selenide have been successfully tested for the desired scattering effects in our experiments, and also other semiconductors such as the II–IV–V semiconductors, silicon carbide (SiC) and organic semiconductors, to the extent that they have suitably large bandgaps. Nearly all of these semiconductors have substantially parabolic conduction bands and would not have been considered useful in employing the teaching of the above-cited patent.

We have also found it advantageous to antireflection-coat the surfaces of the semiconductor through which the scattered radiation is to be resonated or extracted. A separate optical resonator is then provided by disposing reflectors beyond those surfaces aligned along an axis therethrough and made reflective in the visible or ultraviolet frequency bands of the expected scattered light. For use with some of the most desirable semiconductors for this purpose, one of the reflectors would be substantially totally reflective in adjacent frequency bands of the visible and ultraviolet regions of the spectrum; and the other would be highly reflective but also partially transmissive in the same frequency bands.

BRIEF DESCRIPTION OF THE DRAWING

Other features and advantages of our invention will become apparent from the following detailed description, taken together with the drawing, in which the sole figure is a partially pictorial and partially block diagrammatic illustration of a preferred embodiment of the invention.

DETAILED DESCRIPTION OF ILLUSTRATIVE EMBODIMENT

In the preferred embodiment of the drawing, the visible or ultraviolet light source 11, illustratively a laser, supplies coherent pumping light through a polarizer 13 to the tunable Raman device 12. Light, as used in this context, includes not only visible light but also the adjacent portion of the ultraviolet region of the spectrum, in which suitable pumping intensity is available with present technology of optical sources.

For coherent pump light of sufficient intensity (above a threshold level for stimulated Raman scattering) the output light will be coherent and intense, as well as shifted in frequency.

In most of our experiments, the light source 11 was an argon ion laser operating at 4880 Angstroms or 5145 Angstroms at a peak power level of 200 milliwatts. It also could be any other light source of suitable photon energy $h\nu_p$, where h is Planck's constant and $\nu_p$ is the desired pump light frequency.

The polarizer 13 polarizes the pump light into the plane of the paper, as shown, and lens 14 focuses it to an intense spot, e.g., 1 millimeter diameter, in the center of a semiconductive body 15 within Raman device 12. The semiconductive body 15 is illustratively a single crystal but could also be polycrystalline.

The Raman device 12 further includes the antireflection coatings 16 and 17 on opposite surfaces of crystal 15, the totally reflective reflector 18 and the partially transmissive reflector 19, all intercepting and suitably aligned along the expected axis of the scattered light, which in this case could be any axis orthogonal to the axis of the coil 20, which is also a part of device 12. Other geometrical relations between polarization and field directions can also be employed.

The coil 20 is illustratively a field coil in two halves, separated sufficiently in order not to block the paths of either the pump light or the scattered light. It is connected in series with an electrical driving source 21 and a resistor 22 in order to provide a desired value of magnetic flux B, into the plane of the paper, as shown. Preferably, the flux B is substantially uniform throughout crystal 15. The scattered light is analyzed by analyzer 23 and received by a receiver 24 which can utilize the scattered light. As an example, scattered light could be useful in a heterodyne optical communication system; and receiver 24 could be the mixing stage and subsequent components of a receiver for such a communication system. It is also possible to modulate the scattered light frequency by modulating the magnetic flux.

The operation of our invention will be better understood by considering, first, the nature of the active materials usable in the frequency shifter.

The reference above to the various classes of semiconductor compounds can be understood as follows:

II–VI semiconductors are those such as cadmium sulfide, zinc selenide, zinc telluride and zinc sulfide, which have an anion from group II of the periodic table and a cation from group VI of the periodic table. All of the II–VI semiconductors have substantially parabolic conduction bands and significantly larger bandgaps than the semiconductors of the above-cited patent, which characteristically would employ a III–V semiconductor in order to obtain a nonparabolic conduction band. Moreover, the II–VI semiconductors typically have bandgaps in the green, blue, violet and ultraviolet regions of the spectrum.

The II–IV–V semiconductors include such compounds as cadmium tin phosphide and zinc silicon phosphide. In this case the material includes an element such as tin from column IV of the periodic table, which typically has a valence of +4 in combination with the elements from columns II and V of the periodic table. Hereinafter, for the sake of brevity, these various classes of semiconductors will be designated by the conventional Roman numeral short form designation. The II–IV–V semiconductors also have parabolic conduction bands and typically may have bandgaps covering the same general range as the II–VI semiconductors.

Another inorganic compound which has semiconducting properties and a parabolic conduction band, together with a bandgap in the yellow-green region of the spectrum, is silicon carbide. There are also organic materials which have similar semiconducting properties, bandgaps and parabolic conduction bands. An illustrative organic material is naphthalene. Another is anthracene.

EXAMPLE 1

In our first exemplary experiment we employed spin-reversal Raman scattering from free electrons in *n*-type cadmium sulfide (CdS) having $n \sim 3.8 \times 10^{19}$ electrons per cubic centimeter. Its bandgap corresponded to a wavelength of about 4850 Angstrom units. The device 12 was operated at 83° Kelvin and at various strengths of the magnetic field B from 6 kilogauss to 95 kilogauss and pumped with 5145 Angstrom unit coherent light from an argon ion laser. The scattered light was analyzed and received as in the drawing, and was observed to have a frequency shift which was linearly related to the magnetic field strength. The maximum frequency shift was approximately 8 cm.$^{-1}$ (wave numbers). This frequency shift was consistent with known *g*-values of the free conduction electrons in cadmium sulfide. The *g*-value (gyromagnetic ratio) is a parameter that is related to spin-reversal transitions.

Since the spin-reversal light was observed to be polarized as shown in the drawing, we conclude, on the basis of existing theory, that the polarizations of the input and output light with respect to the magnetic field direction can be essentially the same as in the above-cited patent for the various materials designated above. Thus, when the pump light is polarized parallel to the field as in the drawing, the scattered light will be polarized orthogonal to the field and when the pump light is polarized orthogonal to the field, the scattered light will be polarized parallel to the field in either linear or circular polarization. In more technical terms, we observed the spin-reversal scattering only for the $\alpha_{XZ}$ (which is equivalent to $\alpha_{yz}$, $\alpha_{zy}$and $\alpha_{zx}$) polarization derivative and not for $\alpha_{zz}$ or $\alpha_{xy}$ or $\alpha_{xx}$ . The meaning of the polarization derivatives should be clear to those skilled in the Raman-scattering art.

However, we do not wish to restrict ourselves to these particular combinations of polarizations.

The intensity of the spin-reversal scattering was surprisingly great. At a field value of 80 kilogauss, the ratio of the peak height of Rayleigh scattering to the peak height of the Raman scattering was only about 11:1 for incoherent scattering, compared to a typical ratio of about $1 \times 10^4$:1 for a typical Raman-scattering experiment. Thus, our analysis shows the threshold intensity for the stimulated emission of coherent scattered light to be low enough to be within the reach of existing lasers for each of the materials of interest.

In this connection it should be noted that we attribute the scattering strength in part to be related to the fact that we chose the pump frequency $\nu_p$ to be just below the frequency corresponding to the bandgap of the semiconductor 15.

In mathematical terms:

$$E_g \approx h\nu_p + \Delta E, \qquad (1)$$

where $$0.01 \text{ ev. } \; \Delta E \; 1.0 \text{ ev.} \qquad (2)$$

$E_g$ being the bandgap energy in ev. (electron volts).

The calculated threshold of stimulated scattering for cadmium sulfide should be lowest when pumped at about 5145 A. which is one of the strongest argon ion laser lines. The estimated gains are, in fact, sufficiently large that continuous-wave operation appears feasible. By varying the magnetic field over the entire range from 0 to 95 kilogauss, we can obtain a total tuning range of the scattered light (Stokes wave) of about 8 cm.$^{-1}$. For semiconductors with larger effect *g*-valves than CdS, the tuning range will be correspondingly larger.

EXAMPLE 2

We have also successfully conducted spin-reversal scattering experiments with zinc selenide as the body 15 in the Raman-scattering frequency shifter 12. The scattering was as strong as the scattering in cadmium sulfide but was tunable over a small frequency range. For example, the total frequency shift at a field strength of 100 kilogauss was 300 GHz, due to the smaller *g*-valve. We made similar measurements with both 4880 A. and 5145 A. argon lasers as source 11 at various temperatures from 4°up to 200° K. and in samples with carrier concentrations from $1 \times 10^{16}$ to $4 \times 10^{19}$ per cubic centimeter. No significant reduction in scattering effect was observed anywhere within the ranges of these parameters.

Hence, tunable frequency shifting according to our invention should be obtainable in a great variety of semiconductors under a wide variety of conditions. We suggest that the useful range of free charge carrier concentrations for semiconductors employed according to our invention will be from about $1 \times 10^{15}$harge carriers per cubic centimeter to about $1 \times 10^{20}$p er cubic centimeter.

We have also concluded that a desirable pumping source for a frequency shifter according to our invention is a high-power dye laser such as the coumarin dye laser.

OTHER EXAMPLES

It is also possible to scatter light from mobile holes in P-type semiconductors. For example, we propose P-type zinc telluride employed as semiconductor 15, together with a 5208 A. krypton laser, 6328 A. helium neon laser, or 6943 A. ruby laser as source 11.

An ultraviolet example of our invention is an embodiment employing N-type zinc sulfide as semiconductor 15 and a 3371 A. nitrogen laser or 3250 A. cadmium-ion laser as the pumping laser 11. This example will provide a magnetically tunable ultraviolet frequency shifter. Zinc sulfide has perhaps the largest bandgap of all the materials which we presently conceive could be employed in embodiments of our invention. Hence, zinc sulfide will enable such frequency shifters to operate farthest into the ultraviolet.

To pump organic semiconductors, it is necessary to choose a pumping laser that avoids various absorptions in the organic molecule as well as being not too far below the bandgap in frequency. For example, with naphthalene as semiconductor 15, (gap ≈4.5 ev) laser 11 would be 3371 A. nitrogen.

With respect to the foregoing examples of the embodiment of the drawing, it should be observed that spin-reversal scattering from free, or mobile, charge carriers has been selectively received. The use of scattering from the free charge carriers offers several advantages as compared to scattering from bound electrons. First, the free electrons may be produced in the semiconductor body by nonstoichiometric growth, by impurity-doping, by electron beam pumping, by sufficiently strong optical pumping to produce two-photon absorption, or by optical pumping above the bandgap energy.

Second, the emission process does not rely on accidental resonances of certain impurity states in the semiconductor with the laser frequency. Hence, our technique may employ any semiconductor having a parabolic conduction band and a sufficient population of free electrons or holes.

The term semiconductor should be read broadly enough to cover materials that are insulating in the absence of carrier injection, but into which materials sufficient carriers can be injected to permit the scattering of light from those carriers.

It is claimed:

1. A frequency shifter of the type comprising
   a body of material containing charge carriers capable of spin-reversal transitions in the presence of a magnetic field and incident electromagnetic radiation, said transitions being effective to scatter said radiation,
   means for applying a magnetic field to said crystal,
   means for applying pumping radiation to said crystal,
   said frequency shifter being characterized in that
   said pumping radiation applying means comprises
      a source of optical radiation of frequency $\nu_p$at least as high as a visible frequency, and
   said body of material comprises
      a semiconductor having a substantially parabolic conduction band and a bandgap energy, $E_g$, greater than $h\nu_p$.

2. A frequency shifter according to claim 1 in which the semiconductor bandgap energy $E_g$and the optical radiation frequency $\nu_p$are related as follows: $E_g=h\nu_p+\Delta E$, where 0.01ev $\Delta E$ 1.01 ev.

3. A frequency shifter according to claim 1 in which the semiconductor is a semiconductor selected from the group consisting of II–VI semiconductors, II–IV–V semiconductors, SiC and organic semiconductors.

4. A frequency shifter according to claim 3 in which the semiconductor bandgap energy $E_g$and the optical radiation frequency $\nu_p$are related as follows: $E_g=H\nu_p+\Delta E$ where 0.01ev $\Delta E$ 1.0ev.

5. A frequency shifter according to claim 4 in which $\nu_p$is an ultraviolet frequency, the source of radiation of frequency $\nu_p$-being an ultraviolet laser.

6. A frequency shifter according to claim 1 including an optical resonator disposed about the body of material to define a preferred axis of propogation of the scattered radiation, said resonator comprising a plurality of reflectors having substantial reflectivity through adjacent bands of the visible and ultraviolet regions of the spectrum, the surfaces of said body intercepting said axis being antireflection-coated for said frequency bands.

7. A frequency shifter according to claim 3 in which the source of optical pumping radiation supplies coherent optical radiation of frequency $\nu_p$.

* * * * *